United States Patent [19]

Fujitani et al.

[11] 4,367,162

[45] Jan. 4, 1983

[54] CATALYST FOR PURIFYING EXHAUST GASES AND A METHOD FOR PRODUCING THE CATALYST

[75] Inventors: Yoshiyasu Fujitani; Hideaki Muraki, both of Nagoya; Shiroh Kondoh, Aichi; Makoto Tomita, Obu; Tamotsu Nakamura, Nagoya; Kouji Yokota, Nagoya; Hideo Sobukawa, Nagoya, all of Japan

[73] Assignee: Kabushiki Kaisha Toyota Chuo Kenkyusho, Aichi, Japan

[21] Appl. No.: 240,326

[22] Filed: Mar. 4, 1981

[30] Foreign Application Priority Data

Mar. 6, 1980 [JP] Japan ............................... 55-28953

[51] Int. Cl.$^3$ ....................... B01J 21/04; B01J 21/06; B01J 23/10; B01J 23/42
[52] U.S. Cl. ............................... 252/443; 252/455 R; 252/457; 252/462; 423/213.5
[58] Field of Search ................... 252/462, 443, 455 R, 252/457; 423/213.5

[56] References Cited

U.S. PATENT DOCUMENTS

| | | | |
|---|---|---|---|
| 3,669,906 | 6/1972 | Koberstein et al. | 252/466 J |
| 3,850,847 | 11/1974 | Graham et al. | 252/462 |
| 4,076,792 | 2/1978 | Foster et al. | 252/466 PT |
| 4,261,862 | 4/1981 | Kinoshita et al. | 252/462 X |

Primary Examiner—W. J. Shine
Attorney, Agent, or Firm—Oblon, Fisher, Spivak, McClelland & Maier

[57] ABSTRACT

A catalyst for reducing nitrogen oxides, carbon monoxide and hydrocarbons, the noxious components in exhaust gases from internal combustion engines, etc., which comprises: a carrier having a substructure of refractory material in the form of a honeycomb structure, etc., and a porous layer of a powder formed on the surface thereof selected from the group consisting of a powder of zirconium oxide and a mixed powder of zirconium oxide powder with at least one powder selected from the group consisting of alumina, alumina-magnesia spinel and cerium oxide; and a catalyst ingredient supported thereon consisting of cerium oxide and a metal selected from the group consisting of platinum, palladium and mixtures thereof.

19 Claims, 1 Drawing Figure

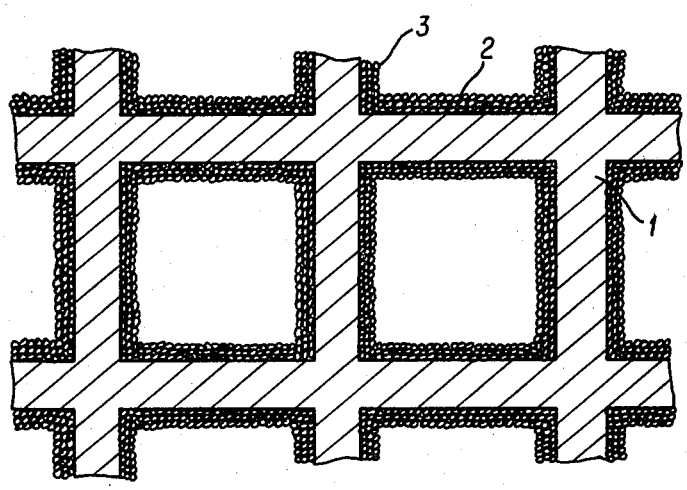

CATALYST FOR PURIFYING EXHAUST GASES AND A METHOD FOR PRODUCING THE CATALYST

BACKGROUND OF THE INVENTION

1. Field of the Invention

This invention relates to a catalyst for purifying exhaust gases which can reduce with high efficiency nitrogen oxides, carbon monoxide and hydrocarbons, the noxious components of exhaust gases from internal combustion engines, etc.

2. Description of the Prior Art

Various catalysts have been suggested to date for reducing the noxious components of such exhaust gases as mentioned above. Catalysts containing platinum, palladium or rhodium as a catalyst ingredient supported on an alumina carrier are considered to have a relatively superior purifying activity.

However, catalysts containing a single metal of platinum or palladium as a catalyst ingredient, i.e., a platinum (Pt) catalyst and a palladium (Pd) catalyst, have a poor purifying activity, especially in reducing nitrogen oxides ($NO_x$). Therefore, catalysts containing a mixed metal of platinum or palladium with rhodium as a catalyst ingredient, i.e., a platinum-rhodium (Pt-Rh) catalyst and a palladium-rhodium (Pd-Rh) catalyst have been put to practical use. Nevertheless, the amount of rhodium present on the earth is said to be from one tenth to one fifth of the amount of platinum. Therefore, the use of rhodium should be reduced to as small an amount as possible.

Thus, the various conventional catalysts which have been suggested to date are still unable to meet the requirements for the purification of motor vehicle exhaust gases because they cannot reduce the aforesaid three noxious components with high efficiency, and they cannot be obtained at an economically inexpensive cost.

A need therefor continues to exist for a catalyst for the reduction of nitrogen oxides, carbon monoxide and hydrocarbons in the exhaust gases from internal combustion engines, which exhibits high efficiency for said reduction and which can be obtained at an economically inexpensive cost.

SUMMARY OF THE INVENTION

Accordingly, one object of the invention is to provide a catalyst for efficiently and effectively reducing nitrogen oxides, carbon monoxide and hydrocarbons which are the noxious components in exhaust gases from internal combustion engines, etc.

Another object is to provide a catalyst having an especially superior effect in the simultaneous reduction of the noxious components in gases exhausted from an internal combustion engine operated at an air-fuel ratio of from 13.5 to 15.5.

A further object of the present invention is to provide a catalyst which has high mechanical strength and durability at high temperatures.

A still further object is to provide a catalyst which can be obtained at an economically inexpensive cost.

It is another object to provide a method for producing the aforesaid efficient and superior catalyst.

Briefly these objects and other objects of the invention as hereinafter will become more readily apparent can be attained by providing a catalyst for purifying exhaust gases, said catalyst comprising cerium oxide ($CeO_2$) and a metal of platinum (Pt), palladium (Pd) or mixtures thereof as a catalyst ingredient supported on a carrier, said carrier having a substructure of refractory material in the form of a honeycomb structure, or the like, and a porous layer of a powder formed on the surface thereof selected from the group consisting of zirconium oxide powder and a mixed powder of zirconium oxide powder with at least one powder selected from the group consisting of alumina, alumina-magnesia spinel and cerium oxide.

BRIEF DESCRIPTION OF THE DRAWING

The above and other features and advantages of this invention will become more apparent from the following description when considered in connection with the accompanying drawing wherein:

The FIGURE is a sectional view of the catalyst used in the Examples in accordance with the present invention.

DETAILED DESCRIPTION OF THE PREFERRED EMBODIMENTS

In the catalyst of the present invention, as shown in the drawing, a porous layer 2 is formed on the surface of a substructure 1 in the form of a honeycomb structure, etc., and the catalyst ingredient 3 is supported on the porous layer 2.

According to this invention, a catalyst can be provided which can reduce the aforesaid noxious components, i.e., nitrogen oxides ($NO_x$), carbon monoxide (CO) and hydrocarbons (HC), with high efficiency. The catalyst exhibits an especially superior effect for the simultaneous reduction of the aforesaid noxious components in gases exhausted from an internal combustion engine which is operated at an air-fuel ratio (the weight ratio of air to gasoline fed into the internal combustion engine) of from 13.5 to 15.5.

Since the catalyst of the present invention comprises a carrier containing zirconium oxide powder and a catalyst ingredient supported thereon consisting of cerium oxide and a metal of platinum, palladium or both, the catalyst has high durability when used in exhaust gases from an internal combustion engine. The superior purifying activity and durability which the catalyst of this invention exhibits as mentioned above are considered to be due to the synergistic effects of both zirconium oxide in the carrier and cerium oxide as a catalyst ingredient.

Furthermore, since cerium oxide and a metal of platinum, palladium on both are used as a catalyst ingredient, the catalyst of the present invention can be obtained at an inexpensive cost as compared with the catalyst using rhodium as a catalyst ingredient.

In the present invention, the substructure is not required to be capable of supporting the catalyst ingredient, as the catalyst ingredient is supported on the porous layer formed on the substructure constituting a so-called skeleton. For this reason, the material having a high mechanical strength can be selected for the substructure so that the durability of the catalyst as a whole can be improved. According to this invention, the substructure on which the porous layer is formed is made of refractory material such as cordierite, mullite, silicon carbide and α-alumina. The form of the substructure may be any of a honeycomb structure, a pillar and a pellet. In this invention, however, the substructure in the form of a honeycomb structure exhibits the best effect as compared with the substructure in the form of other structures.

The porous layer which constitutes the surface layer of the carrier is made of a powder of zirconium oxide or a mixed powder of zirconium oxide powder with at least one powder of alumina, alumina-magnesia spinel and cerium oxide. As the alumina, α-alumina or δ-alumina is employed.

The formation of the porous layer of the aforesaid powders is effected by adding a binder such as aluminum nitrate, a thickener such as polyvinylalcohol, and water to the aforesaid powders, mixing the whole together, adhering the resulting mixture to the surface of the substructure, drying and heating the adhered mixture at high temperatures of 600° C. to 900° C., whereby the aforesaid powders are sintered. Adhering the mixture to the surface of the substructure is carried out, for example, by dipping the substructure in a slurry of the aforesaid mixture.

It is more advantageous to use a mixed powder of zirconium oxide powder with at least one powder of alumina, alumina-magnesia spinel and cerium oxide than only the powder of zirconium oxide as the material of the porous layer in that the catalyst can exhibit more increased purifying activity and can be produced at an inexpensive cost.

If the powder of alumina-magnesia spinel is used as one of the mixed powder with the powder of zirconium oxide, it is possible to provide the catalyst having a higher mechanical strength and superior durability at high temperatures. Namely, alumina-magnesia spinel ($MgAl_2O_4$) has a high mechanical strength at high temperatures, and even when it is used at high temperatures, the crystal structure does not change and the reduction of its surface area and mechanical strength which accompany the above change are obviated. Moreover, the catalyst exhibits a good duration of catalytic activity at high temperatures.

Preferably, the porous layer formed on the substructure amounts to 5 to 40 percent by weight relative to the substructure. It is preferable that the porous layer has a substantially uniform thickness of 0.05 to 0.5 mm.

An average pore diameter of the porous layer is preferably 0.01 to 2 microns. If its average pore diameter falls outside the above-specified range, it is difficult for the catalyst to exhibit a superior activity in the purification of exhaust gases.

Now, the description will be given of supporting the catalyst ingredient on the porous layer.

The amount of cerium oxide supported on the carrier is preferably from 5 g to 100 g per liter of the carrier which comprises the substructure and the porous layer formed thereon. If the amount of cerium oxide is less than 5 g/l, the purifying activity of the catalyst is low, and if its amount is more than 100 g/l, no corresponding increase in activity can be observed.

One liter of the carrier which comprises the substructure and the porous layer corresponds to the weight of about 600 g to 1,000 g if the carrier is in the form of pellets, and a liter thereof in the form of honeycomb structures corresponds to the weight of about 500 g to 900 g.

The total amount of a metal of platinum, palladium or both supported on the carrier is preferably 0.01 g to 50 g per liter of the carrier. If the amount is less than 0.01 g/l, the purifying activity of the catalyst is low, and if its amount is more than 50 g/l, no corresponding increase in activity can be observed.

While the carrier comprises the substructure and the porous layer, the carrier is not substantially different from the substructure in its volume, because the thickness of the porous layer is very small as mentioned above. The volume of the carrier or the substructure is referred to as the apparent volume of the entire substructure or carrier, irrespective of its structure, i.e., whether it may be the honeycomb structure or the pellet.

Supporting of the aforesaid catalyst ingredients on the porous layer is effected, as shown in the Examples which will hereinafter be described, by dipping the porous layer for impregnation in a solution of raw materials forming each of the catalyst ingredients such as cerium (III) nitrate [$Ce(NO_3)_3.6H_2O$], cerium (III) chloride [$CeCl_3.7H_2O$], palladium nitrate [$Pd(NO_3)_2$], platinum nitrate [$Pt(NO_3)_4$], and chloroplatinic acid [$H_2PtCl_6.6H_2O$], drying and calcining the impregnated porous layer. By the calcination, each of the aforesaid raw materials is converted into the respective catalyst ingredients of cerium oxide ($CeO_2$), platinum (Pt) and palladium (Pd), and is supported on the porous layer.

EXAMPLE 1

A porous layer of zirconium oxide powder was formed on the wall surface of a substructure in the form of a honeycomb structure. The catalyst ingredient consisting of cerium oxide ($CeO_2$) and a metal of platinum (Pt), palladium (Pd) or both was supported on the aforesaid porous layer, whereby the catalyst of this invention was prepared. Then, the durability of the catalyst was tested in exhaust gases at high temperature, and thereafter its purifying activity was evaluated.

The honeycomb structure was made of cordierite, and had a cell thickness of 0.15 mm and a cell number of 300/in$^2$ (per square inch).

The formation of the porous layer of zirconium oxide was carried out by dipping the honeycomb structure in a slurry which consisted of zirconium oxide powder having an average particle diameter of 1μ, aluminum nitrate as a binder, polyvinylalcohol as a thickener and water, adhering the zirconium oxide powder to the wall surface of the honeycomb structure, and heating the adhered powder at 900° C. for 4 hours. The porous layer of zirconium oxide powder had a thickness of 0.2 to 0.3 mm, and a weight of 70 g per 700 g of the honeycomb structure of cordierite.

When the catalyst ingredient was supported on the carrier, an aqueous solution of each of cerium (III) nitrate, platinum nitrate and palladium nitrate was used for supporting cerium oxide, platinum and palladium, respectively. Each of the aforesaid nitrates was converted by calcining into the corresponding catalyst ingredient to be supported on the carrier. In supporting the catalyst ingredient on the carrier, cerium oxide was firstly supported, followed by supporting a metal of platinum, palladium or the mixtures thereof.

Thus, the catalysts (Nos. 1-5) in accordance with the present invention, were prepared as shown in TABLE 1.

The amount of each catalyst ingredient supported on the carrier shown in TABLE 1 is indicated by its weight (g) per liter of the carrier.

Each of the catalysts prepared as above described, as shown in the drawing, comprises the porous layer 2 formed on the surface of the substrate 1 of cordierite in the form of a honeycomb structure and the catalyst ingredient 3 with which the porous layer 2 was impregnated.

To evaluate the durability of these catalysts, each of the catalysts was kept at 800° C. for 100 hours in the atmosphere filled with an exhaust gas from an internal combustion engine of an automobile operated with the theoretical air-fuel ratio (A/F=14.6) varying periodically within plus or minus 0.8 with a period of one second. The exhaust gas was fed into the catalyst layer at a space velocity of 25,000/hour.

Then, the purifying activities of the catalysts which were tested on their durability under the above-mentioned conditions were evaluated.

Each of the catalysts was filled in a quartz tube and heated to be kept at 400° C. An exhaust gas from an internal combustion engine of an automobile was fed into the tube at a space velocity of 30,000/hour. The exhaust gas was provided by operating the internal combustion engine with the theoretical air-fuel ratio varying periodically within plus or minus 0.8 with a period of 2 seconds. The variation of the air-fuel ratio was so wide in its range and the period was so long that the above-mentioned conditions as the evaluation of purifying activities were severer than the conventional ones. The average concentrations of the noxious components in the exhaust gas in the above operation were approximately 0.1% for nitrogen oxides ($NO_x$), 0.62% for carbon monoxide (CO), 0.05% for hydrocarbons (HC), 12% for carbon dioxide ($CO_2$), 0.2% for hydrogen ($H_2$), 0.54% for oxygen ($O_2$), 13% for water ($H_2O$), and the remainder being nitrogen ($N_2$), all by volume.

The purifying activities were rated by the percent reduction of the above noxious components. The results are shown in TABLE 2.

TABLE 1

| Catalyst No. | Amount of Catalyst Ingredient (g/l) | | | |
|---|---|---|---|---|
| | $CeO_2$ | Pd | Pt | |
| 1 | 51.6 | 3.0 | — | Invention |
| 2 | 51.6 | 3.0 | 0.5 | |
| 3 | 51.6 | — | 3.0 | |
| 4 | 77.4 | 3.0 | — | |
| 5 | 77.4 | 3.0 | 0.5 | |

TABLE 2

| Catalyst No. | | 1 | 2 | 3 | 4 | 5 |
|---|---|---|---|---|---|---|
| Percent | HC | 85 | 87 | 82 | 86 | 87 |
| Reduction | CO | 95 | 95 | 96 | 96 | 95 |
| (%) | $NO_x$ | 88 | 87 | 90 | 89 | 91 |

It is evident from the above TABLE that the catalysts of this invention have remarkably high activities for purifying any of the three noxious components. It is particularly noteworthy in this Example that the catalysts of this invention can exhibit a high purifying activities under severe conditions, while their activities were evaluated under severe conditions in the variation of the air-fuel ratio, after the severe durability test was conducted as described above. It will also be evident from the comparative examples shown in TABLES 3 and 4 below that the catalysts of this invention have a much higher purifying activity than the comparative catalysts not containing zirconium oxide in the porous layer.

EXAMPLE 2

A mixed powder of zirconium oxide powder with at least one powder of δ-alumina ($Al_2O_3$), α- alumina ($Al_2O_3$), alumina-magnesia spinel ($MgAl_2O_4$) and cerium oxide ($CeO_2$) was sintered to from a porous layer on the surface of the substructure in the form of a honeycomb structure of the same type as shown in Example 1, and the catalyst ingredient was supported on the porous layer to prepare the catalyst of this invention. The catalyst thus obtained was tested for durability, and then, its purifying activity was evaluated.

The composition of the mixed powder used for the porous layer of each catalyst and its percent by weight (wt. %) thereof based on the substructure are shown in TABLE 3. The average particle diameter of the mixed powder, the condition of the adherence of the powders to the substructure, the sintering temperature and the thickness of the porous layer were all the same as described in Example 1. Furthermore, the preparation of the catalysts, their durability tests and the evaluation of their purifying activity were also carried out in the same manner as Example 1.

The amount of each catalyst ingredient supported on the porous layer of each catalyst and the percent reduction thereof are shown in TABLE 4.

For comparison, the comparative catalysts (Nos. $S_1$ to $S_8$) were prepared in the same manner as above except that zirconium oxide was not contained in the porous layer. The durability was tested on the comparative catalysts and their purifying activity was evaluated in the same manner as above.

The results of evaluation for these comparative catalysts were also shown in TABLES 3 and 4.

It is evident from TABLES 3 and 4 that the catalysts of this invention can exhibit a higher purifying activity than any comparative catalyst (compare, for example, Catalysts Nos. 6 and $S_1$, Nos. 8 and $S_5$, Nos. 10 and $S_4$, and Nos. 12 and $S_6$).

TABLE 3

| Catalyst No. | Composition of Porous Layer (wt. %) | | | | | |
|---|---|---|---|---|---|---|
| | $ZrO_2$ | δ-$Al_2O_3$ | α-$Al_2O_3$ | $MgAl_2O_4$ | $CeO_2$ | |
| 6 | 5 | 5 | — | — | — | In- |
| 7 | 5 | 5 | — | — | — | ven- |
| 8 | 5 | — | 5 | — | — | tion |
| 9 | 5 | — | 5 | — | — | |
| 10 | 5 | — | — | 5 | — | |
| 11 | 5 | — | — | 5 | — | |
| 12 | 5 | — | — | — | 5 | |
| 13 | 5 | 3 | — | 4 | — | |
| 14 | 5 | — | — | 10 | — | |
| 15 | 10 | — | — | 5 | — | |
| 16 | 10 | — | — | 5 | — | |
| $S_1$ | — | 10 | — | — | — | Com- |
| $S_2$ | — | 10 | — | — | — | pari- |
| $S_3$ | — | 5 | 5 | — | — | son |
| $S_4$ | — | — | — | 10 | — | |
| $S_5$ | — | — | 10 | — | — | |
| $S_6$ | — | — | — | — | 10 | |
| $S_7$ | — | 5 | — | — | 5 | |
| $S_8$ | — | — | — | 10 | 5 | |

TABLE 4

| Catalyst No. | Amount of Catalyst Ingredient (g/l) | | | Percent Reduction (%) | | | |
|---|---|---|---|---|---|---|---|
| | $CeO_2$ | Pd | Pt | HC | CO | $NO_x$ | |
| 6 | 51.6 | 3.0 | — | 86 | 95 | 89 | Invention |
| 7 | 51.6 | — | 3.0 | 83 | 97 | 91 | |
| 8 | 51.6 | 3.0 | — | 86 | 95 | 90 | |
| 9 | 51.6 | — | 3.0 | 88 | 96 | 92 | |
| 10 | 51.6 | 3.0 | — | 90 | 97 | 90 | |
| 11 | 51.6 | — | 3.0 | 90 | 96 | 93 | |
| 12 | 20.8 | 3.0 | 0.5 | 89 | 97 | 94 | |
| 13 | 51.6 | 3.0 | 0.5 | 89 | 96 | 93 | |

TABLE 4-continued

| Catalyst No. | Amount of Catalyst Ingredient (g/l) | | | Percent Reduction (%) | | | |
|---|---|---|---|---|---|---|---|
| | CeO₂ | Pd | Pt | HC | CO | NOₓ | |
| 14 | 51.6 | 3.0 | 0.5 | 92 | 97 | 92 | |
| 15 | 51.6 | 3.0 | — | 95 | 95 | 95 | |
| 16 | 51.6 | 3.0 | 0.5 | 96 | 96 | 96 | |
| S₁ | 51.6 | 3.0 | — | 74 | 88 | 75 | Comparison |
| S₂ | 51.6 | — | 3.0 | 73 | 89 | 78 | |
| S₃ | 51.6 | 3.0 | 0.5 | 74 | 83 | 76 | |
| S₄ | 51.6 | 3.0 | — | 80 | 86 | 78 | |
| S₅ | 51.6 | 3.0 | — | 73 | 90 | 74 | |
| S₆ | 10.4 | 3.0 | 0.5 | 78 | 84 | 76 | |
| S₇ | 20.8 | 3.0 | 0.5 | 74 | 88 | 79 | |
| S₈ | 18.9 | 3.0 | 0.5 | 75 | 82 | 73 | |

What is claimed as new and intended to be covered by Letters Patent is:

1. A catalyst for reducing nitrogen oxides, carbon monoxide and hydrocarbons, the noxious components in exhaust gases which comprises:
   a carrier having a substructure of refractory material and a porous layer of a powder formed on the surface thereof of zirconium oxide powder with at least one powder selected from the group consisting of alumina and alumina-magnesia spinel; and
   a catalyst ingredient supported thereon consisting essentially of cerium oxide and a metal selected from the group consisting of platinum, palladium and mixtures thereof.

2. The catalyst according to claim 1, wherein said substructure of refractory material is one selected from the group consisting of cordierite, mullite, silicon carbide and α-alumina.

3. The catalyst according to claim 1, wherein alumina as one of the mixed powder used for the porous layer is selected from the group consisting of α-alumina and δ-alumina.

4. The catalyst according to claim 1, wherein the form of said substructure is one selected from the group consisting of honeycomb structures, pillars and pellets.

5. The catalyst according to claim 1, wherein said porous layer formed on the substructure amounts to 5 to 40 percent by weight relative to said substructure.

6. The catalyst according to claim 1, wherein the thickness of said porous layer formed on the substructure is from 0.05 to 0.5 mm.

7. The catalyst according to claim 1, wherein an average pore diameter of said porous layer is from 0.01 to 2 microns.

8. The catalyst according to claim 1, wherein the amount of cerium oxide as a catalyst ingredient supported on said carrier is from 5 g to 100 g per liter of said carrier.

9. The catalyst according to claim 1, wherein the amount of said metal supported on said carrier is from 0.01 g to 50 g per liter of said carrier.

10. A method for producing the catalyst of claim 1, which comprises:
    dipping a substructure in a slurry of zirconium oxide powder with at least one powder selected from the group consisting of alumina and alumina-magnesia spinel, a binder and water to adhere the powder to the surface of the substructure;
    drying the powder adhered to the substructure;
    sintering the powder by heating at 600° C. to 900° C. to form a porous layer on the surface of the substructure as a carrier; and
    supporting cerium oxide and a metal selected from the group consisting of platinum, palladium and mixtures thereof as a catalyst ingredient on the carrier.

11. The method according to claim 10, wherein the step of supporting cerium oxide and said metal on the porous layer comprises:
    impregnating the porous layer formed on the substructure with a solution of raw material forming each of the catalyst ingredients;
    drying the impregnated porous layer; and
    calcining it.

12. The method according to claim 11, wherein said raw material of cerium oxide as a catalyst ingredient is one selected from the group consisting of cerium (III) nitrate and cerium (III) chloride.

13. The method according to claim 11, wherein said raw material of platinum as a catalyst ingredient is one selected from the group consisting of platinum nitrate and chloroplatinic acid.

14. The method according to claim 11, wherein said raw material of palladium as a catalyst ingredient is one selected from the group consisting of palladium nitrate.

15. The method according to claim 10, wherein said porous layer formed on the substructure amounts to 5 to 40 percent by weight relative to said substructure.

16. The method according to claim 10, wherein the thickness of said porous layer formed on the substructure is from 0.05 to 0.5 mm.

17. The method according to claim 10, wherein an average pore diameter of said porous layer is from 0.01 to 2 microns.

18. The method according to claim 10, wherein the amount of cerium oxide as a catalyst ingredient supported on said carrier is from 5 g to 100 g per liter of said carrier.

19. The method according to claim 10, wherein the amount of said metal supported on said carrier is from 0.01 g to 50 g per liter of said carrier.

* * * * *